March 21, 1967 W. HELMORE 3,309,795
MECHANISMS FOR SIMULATING THE MOVEMENT OF VEHICLES
Filed July 12, 1961 4 Sheets-Sheet 2

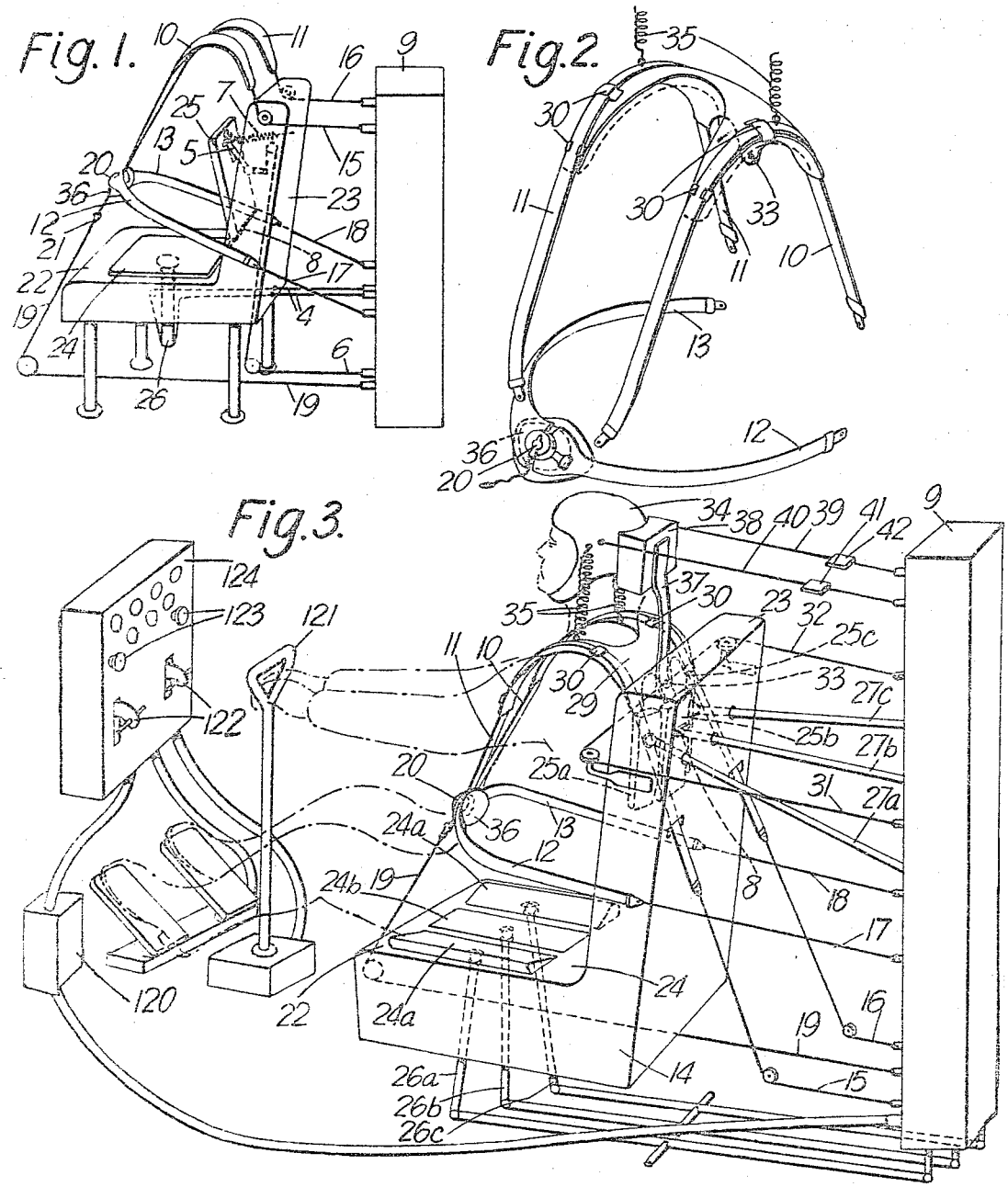

INVENTOR
WILLIAM HELMORE
BY
Bacon & Thomas
ATTORNEYS

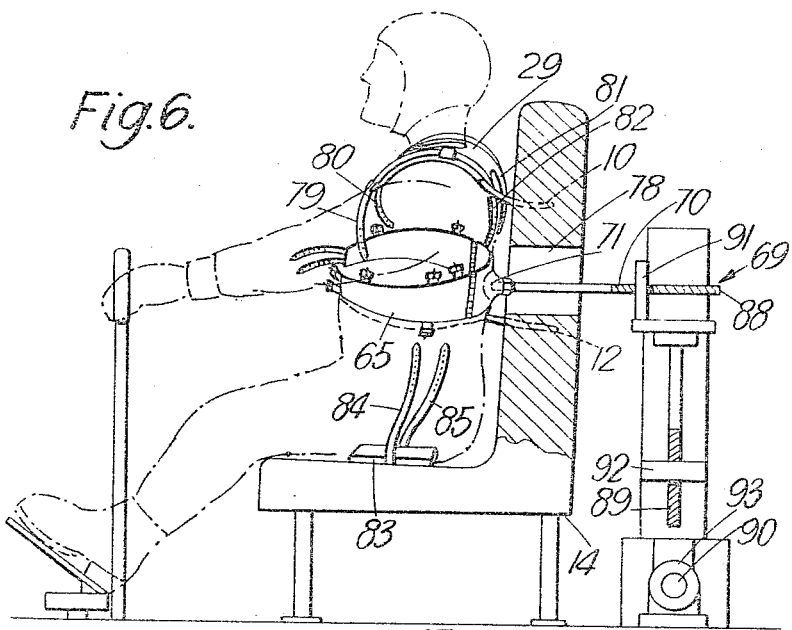
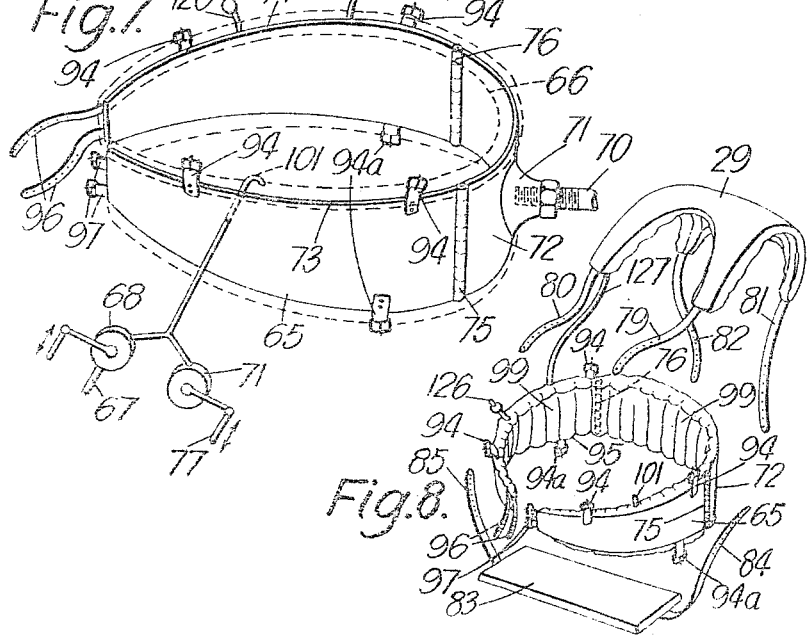

March 21, 1967 W. HELMORE 3,309,795
MECHANISMS FOR SIMULATING THE MOVEMENT OF VEHICLES
Filed July 12, 1961 4 Sheets-Sheet 4
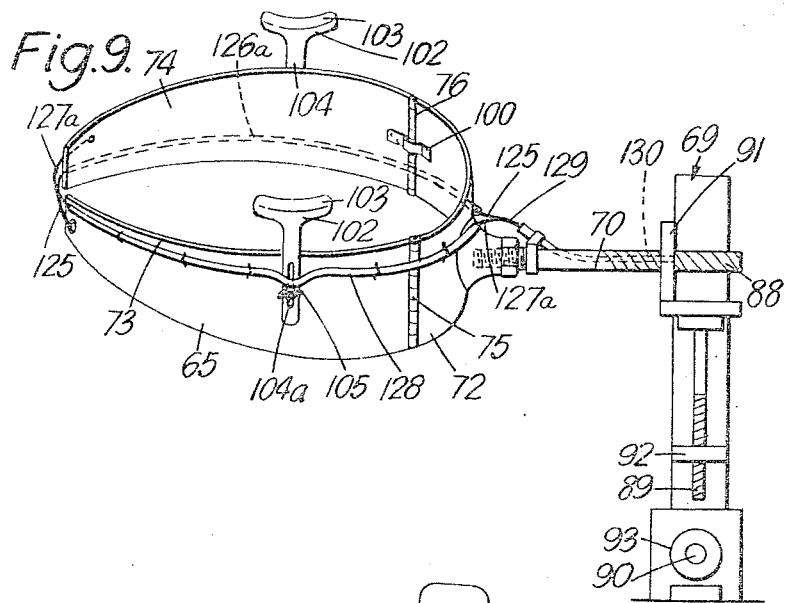
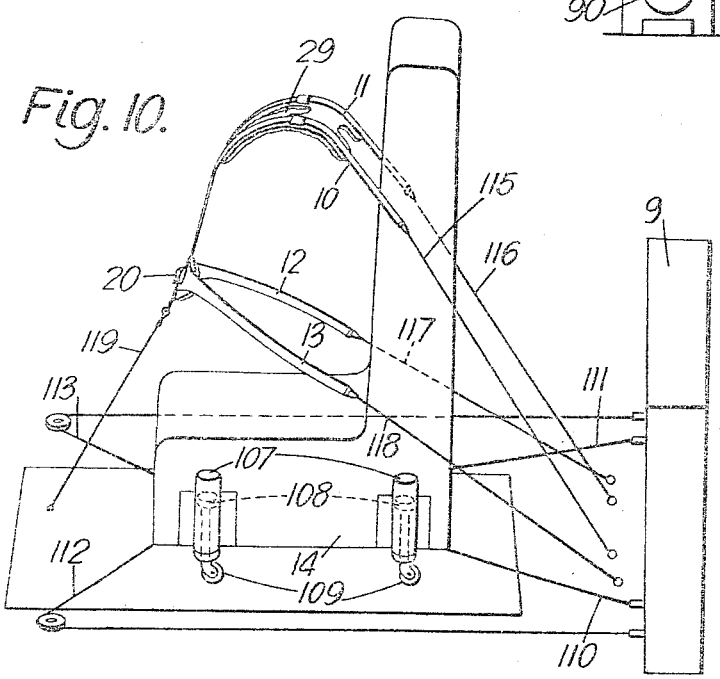
INVENTOR
WILLIAM HELMORE
BY
Bacon & Thomas
ATTORNEYS United States Patent Office 3,309,795
Patented Mar. 21, 1967

3,309,795
MECHANISMS FOR SIMULATING THE
MOVEMENT OF VEHICLES
William Helmore, Kingston Hill, Surrey, England; Lloyds
Bank Limited, 16 St. James's St., London S.W. 1, England, and Douglas Heather Johnson, 2 Gray's Inn
Square, London, W.C. 1, England, executors of said
William Helmore, deceased
Filed July 12, 1961, Ser. No. 126,799
Claims priority, application Great Britain, July 13, 1960,
24,491/60
21 Claims. (Cl. 35—12)

This invention relates to flight simulators and to apparatus designed for the instruction of pupils in the control of aircraft and other vehicles.

It has previously been proposed in flight simulators employed for this purpose to provide a substantially stationary reproduction of the cockpit controls instruments and other environment of the aircraft it is desired to simulate and also to provide for limited changes in attitude of the aircraft in relation to its fore and aft and lateral axes together with some limited movement of the simulator as a whole. Such simulators, however, do not sufficiently impose upon the body of the pupil a sense of the very great changes of momentum occasioned in an aircraft by changes of course, attitude and velocity when actually in flight and thus the training of the pupil is deficient in this important respect.

In actual flight, change in velocity (i.e. acceleration) and in direction of flight of an aircraft are transmitted to the pilot's body, for the most part, through the chair, which is usually fixed to the aircraft, and through the pilot's harness which is attached to the chair; thus owing to the momentum or inertia of the pilot's body at any instant of time such changes in the flight of the aircraft will result in some small relative movement between the pilot's body and the chair and/or harness which movement is restrained by these latter parts and the pilot will experience pressure from them on different parts of his body until his body attains the same velocity and direction of flight as the aircraft. However, as different parts of the human body have different masses and thus different inertia, the pilot will experience not only restraining forces and pressures on different parts of his body from the chair and harness, but also sensations from the different inertia effects on the various parts of his body and those effects are mainly felt in the region of the stomach. The object of the invention is to simulate or reproduce these various effects on a pilot in known training apparatus.

According to this invention a flight simulator comprises a chair mounted upon a support, equipment to be worn by the pilot, power means for imparting relative movement between parts of the said equipment and the chair so as to apply pressures and movements to different parts of the pilot's body such as would be produced by changes in flight conditions due to the inertia of the pilot's body.

The power means may be mounted on a fixed part of the apparatus and may be provided with a number of differentially movable actuating members connected to different parts of the equipment.

The said power means and differentially movable actuating members may have associated therewith control means adapted to be actuated by the pilot in operating his flight and engine controls and/or in adjusting his instruments, or by the instructor or by time controlled means, for example a servo-motor, potentiometer and computer means may be embodied in said controls.

In such an arrangement certain of said actuating members are adapted to impart fore and aft movement to the back of the chair and to apply and release pressure on the pilot's abdomen and to apply up and down movement to the seat of the chair relatively to other parts thereof, downward movement to the shoulders and sideways movement of the pilot's body.

In this last arrangement the equipment may comprise two shoulder straps connected at one end to two of said actuating members so as to impart downward movement thereto and at the other end to the centre of a belt which is connected to another of said actuating members to impart also downward movement thereto and the ends of which belt are connected respectively to another two actuating members so as to impart rearward movement thereto.

The equipment may also comprise a harness worn by the pilot and having a yoke extending around the nape of his neck and over those parts of his shoulders adjacent the neck and means for imparting sideways movement is connected to said parts of the harness.

In an alternative arrangement said power means may comprise a source of fluid pressure and said actuating members comprise inflatable pads associated with said equipment and the back and seat of the chair.

In such an arrangement the equipment may comprise a similar yoke to that described above which embraces the neck and shoulders of the occupant and is connected by straps to the chair and to a belt which is connected to the chair and encircles the waist of the occupant which yoke and centre of the belt are provided with inflatable pads and wherein a distributor valve is arranged differentially to place said pads into and out of communication with said source of pressure with or without means for placing them into communication with a source of vacuum.

The belt may be provided with inflatable pads at locations opposite the sides of the occupant.

The aforesaid inflatable pads may be selectively connected to said fluid pressure through selector valve mechanism and said equipment may comprise an auxiliary harness or suit having said pads secured thereto opposite the seat and back of the chair and over the shoulders and opposite the stomach with or without pads over the pilot's sides and a conventional harness is worn over the suit and has straps which are connected to the chair and pass over the shoulders and are connected to the front of a belt also secured to the chair.

In yet a further form of the equipment comprises a conventional harness and supplementary harness the former of which comprises shoulder straps connected at one end to the chair and passing over the shoulders and connected at the other end to the centre of a flexible belt which is also connected to the chair and the supplementary harness comprises a comparatively rigid belt connected to power means adapted to move it in an up and down, fore and aft, or in sideways directions or in any combination of these movements according to the inertia effects on the pilot's body which require to be simulated.

For example, in the above arrangement should the pilot manipulate the controls in a manner which would result in practice in an increased forward velocity, the body of the pilot is pressed back by the power means against his chair to impose the correct pressure on his back and conversely should he operate the controls to effect a decreased forward velocity the body of the pilot is pressed forward by the power means against his harness to impose the correct pressure of the harness on the front of his body.

Again should the pilot manipulate the controls to give an increased vertical velocity the body of the pilot is pressed downwards by the power means into his chair to impose the correct increase in his apparent weight and vice versa. Other changes of pressure upon the pilot's body against his chair and/or harness while seated at the controls of the simulator may be applied according to any desired combination of adjustments of the controls and instruments which would impose changes of momentum upon the body of the pilot should such adjustments of the controls have been made in actual flight.

As indicated above it is known that the human body is most sensitive to changes of momentum in the abdominal region and for that reason movement is imparted by said power means to the aforesaid auxiliary belt surrounding the pilot. The extent of the movement required is small being limited to the narrow tolerance for movement provided by the pilot's chair and flying harness and thus according to one feature of this invention a movable part of the power means comprises a movable arm passing through an aperture in the back of the pilot's chair and attached to a rigid or semi-rigid portion or portions of the said abdominal belt. The said belt may be composed partly or wholly of flexible, elastic or rigid material and in order to conform with the contours of the pilot's back and abdomen may be provided with an inflatable pneumatic inner membrane. The said belt may be extended to support other areas of the body so that the pressure applied by the said controlling means is distributed as required.

Various supplementary parts of the equipment may be connected to the belt as described and claimed later.

In yet a further form of the invention the equipment is connected to the chair or to the support and said chair is movable in relation to the support in an up and down, fore and aft and sideways direction and power means and associated transmission are provided for imparting any of said movements or combinations thereof.

The following is a description of a number of alternative forms of equipment according to the invention reference being made to the accompanying drawings in which:

FIGURE 1 is a diagrammatic perspective view of a simulator operated by cables;

FIGURE 2 shows a modification of a harness which may be used with the equipment shown in FIGURE 1;

FIGURE 3 shows the harness of FIGURE 2 in use and with an additional head rest and with alternative means for applying pressure to the back, seat and sides of the chair and cable means for applying sideways movement to the neck yoke and shoulder straps;

FIGURE 6 is a diagrammatic side view of a mechanically operated simulator;

FIGURE 7 is a perspective side view of the belt without its lining and forming a part of the harness of FIGURE 6;

FIGURE 8 is a diagrammatic perspective exploded view showing more in detail the harness and associated parts of FIGURE 6;

FIGURE 9 is a perspective view of a mechanically tensioned harness and attachments; and FIGURE 10 is a diagrammatic side view of an alternative form of simulator operated by movement of the pilot's chair.

Like reference numerals refer to like parts in the various figures of the drawing.

Figure 4:
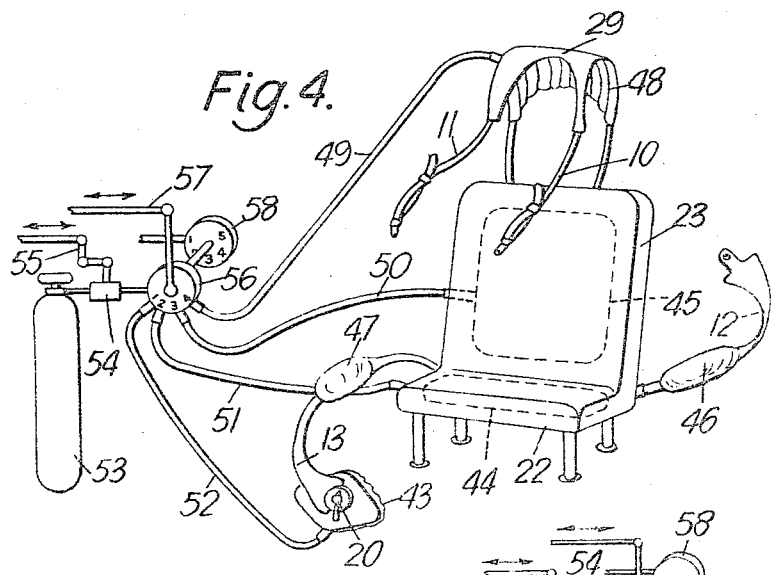
FIGURE 4 is a diagrammatic perspective view of an alternative simulator operated pneumatically.

The arrangements shown in FIGURES 1, 2 and 3 achieve certain of the objects of the invention in a simple and economic way without substantially changing the normal type of pilot's chair and Sutton type flying harness to which the pilot is accustomed in flight and thus simulation is psychologically assisted in this respect, although not achieving the almost entire bodily movement provided by the means described in FIGURES 6, 7 and 8.

Referring to FIGURES 1, 2 and 3 the two shoulder straps 10 and 11 and the two belt straps 12, 13 of the normal Sutton or other flying harness are detached at one end from the chair 14 and are connected to cables 15, 16, 17, 18 respectively which are actuated by power means having differentially movable actuating members indicated generally at 9. A fifth cable 19 passes between the pilot's knees and is attached, to the central plate fastening 20 which connects the straps 10, 11, 12 and 13 together. This latter cable 19 when tensioned in conjunction with the cables 15 and 16 tends to equalise the downward pressure on the two shoulder straps 10 and 11.

The cable 19 is provided with a snap hook 21 for ready detachment of the plate fastening 20 and is helpful in preventing the webbing straps from sliding backwards over the pilot's shoulders. The chair seat 22 and back 23 are provided with movable plates 24, 25 which may be substantially rectangular. The backplate 25 is hinged at its lower end 8 to swing forwards about a horizontal axis against the action of a spring 7 and is controlled by a further cable 6 and lever mechanism 5.

The seat is fixed to a push rod 26, actuated by cables 4.

The plates 24, 25 are padded and arranged so as to permit a total movement of the pilot's body of say 3 to 6 inches from normal.

The positive movement under power by the plates and harness shown particularly assist in providing for the required movement of the pilot's body and may be further used for simulating the type of sudden shock occasioned by air pocket buffeting of an aircraft at high speed or for simulating so-called bumps of any kind.

In order to provide a sideways movement in addition to the vertical up and down movement of the pilot's body the movable plate 24 of the chair seat 22 of FIGURE 1 may be arranged to be separated into three parts 24a, 24b, 24c as shown in FIGURE 3. The centre part 24b is substantially flat and horizontal and is fixed to a vertical push rod 26 and the parts 24a and 24c are inclined upwardly and sideways in relation to the side edges of the part 24b and fixed to push rods 26a and 26c at right angles to them so that when either of them is pushed upwardly it pushes sideways the pilot's body tending to tilt him about a fore and aft axis. Similarly the back may be formed in three separate parts 25a, 25b, 25c. The centre part 25b is hinged to a push rod so that it may swing about a horizontal axis high up on the back of the pilot and so as to have about a third of the plate above said axis and about two thirds below the axis, whereas the other parts 25a and 25c are inclined to the part 25b and are fixed to push rods 27a and 27c which diverge outwardly from the push rod 27b as they extend rearwardly whereby actuation of either of the rods 25a, 25c imparts sideways movement to the pilot's body tending to move him in part about a fore and aft axis, and in part about an upright axis.

To further assist in simulating these movements the cables 17 and 18 may be arranged to be separately and differentially tensioned and relaxed so that the harness tends to be drawn across the pilot's body in either direction thus causing his body to roll to either side of his seat.

The downward pressure of the Sutton shoulder straps 11 when tensioned may be considerable and thus tend to slip outwardly on to the other part of the pilot's shoulders whereafter further tension tends merely to deflect the movable parts of the pilot's collar bones. To prevent this effect the straps 10 and 11 are arranged to pass over a neck yoke 29 shaped from light alloy sheet of the type shown in FIGURE 2, but omitted from FIGURE 1.

The said straps 10 and 11 may slide through guide means 30 FIGURE 2 which permit movement in a fore and aft direction but prevent lateral movement with respect of the edges of the yoke in the region of the neck and the said guide means may be formed from springy material so as to render the yoke readily detachable. In this way the downward tensioning of the straps 10 and 11 will operate through the said yoke 29 to apply pressure over an area around the shoulders in the region of the spine.

Alternative or additional means for securing a lateral or sideways movement of the pilot's body comprise two cables 31, 32 attached by snap hooks to a lug 33 at the back of the yoke shown in FIGURES 2 and 3 and may be alternately tensioned or relaxed laterally to provide the said sideways or laterally rolling movement of the pilot's body. The pilot's helmet 34 (FIGURE 3) may be linked to the yoke by tension springs 35 referred to later.

In order to provide a suitable area of pressure in the neighborhood of the abdomen when the straps 12, 13 are tensioned the fixed side of the fastening means 20 for the normal Sutton flying harness may have attached to it a suitably shaped rigid or semi-rigid back plate 36 FIGURES 1, 2 and 3 extending over the abdomen and lower chest which back plate may be resiliently or inflatably lined.

It will be appreciated that in operating the mechanism shown in FIGURES 1, 2 and 3 to simulate the movements and pressures applied to a pilot due to changes of momentum in flight, the appropriate movable parts of the chair and harness as described above may be employed to apply to the pilot the required movement and pressure in the direction appropriate for the movement of the pilot's controls. The movable parts of the said chair and harness may be arranged to yield somewhat as they would under the same circumstances in flight to take up the slack or spring in the normal fixed Sutton harness and Martin Baker chair and the resilience of the pilot's clothing.

To impose a forward movement of the pilot's head the said back plate 25 may have attached to it a vertical extension 37 (FIGURE 3) which is secured to the normal head rest 38, say of the Martin Baker chair, so that the said head-rest will move with the said back plate and thus ensure that the said head-rest will control the forward movement of the pilot's head.

Other movements of the pilot's head may be secured by cable means or the springs 35 attached to his flying helmet and neck yoke 29 and/or to his oxygen mask (not shown).

A backwards movement of the pilot's head may be effected by tensioning cables 39, 40 detachably fixed to the back or sides of his helmet and passing on either side of the said head-rest.

A known type of centrifugal clutch and spring return 41, 42 already employed in aircraft for controlling the pilot's shoulder straps may be incorporated in the said cable or cables 39, 40 to enable the pilot to make the normal forward movements of his head without undue restraint but to resist and control such movement above a predetermined velocity, for example, that resulting from a force of the order of 1g or more.

The various cables and push rods both in the arrangement of FIGURES 1 and 3 may pass into a control box 9 containing various motors for imparting movement to them which motors may be differentially controlled by potentiometer and/or computer mechanism indicated at 124 and 120 in FIGURE 3 which is conditioned by movement of the pilot's controls such as the joy stick 121, engine throttle controls 122 and manipulating member 123 on the instrument panel 124 incorporating potentiometer controls and controls for an automatic pilot.

FIGURE 4 illustrates simple pneumatic (or hydraulic) means for applying similar movements and pressures to the pilot to those provided by the arrangement illustrated and described for FIGURES 1, 2 and 3.

The normal Sutton type flying harness is provided with a comparatively wide inflatable abdominal pad 43, which pad is disposed in the region of the normal central fastening 20 for the four Sutton harness straps 10, 11, 12, 13 and attached to the fixed fastening side only. The back 23 and seat 22 are provided with inflatable cushions 44, 45 respectively. When the abdominal pad 43 is expanded it presses the pilot backwards against the then collapsed cushion 45 on the back 23 of his chair. The straps 12, 13 are also provided with inflatable pads 46, 47 and likewise to the shoulder straps 10 and 11 if they are employed in a similar manner to that shown in FIGURE 1 alternatively to a neck yoke 29 as shown in FIGURE 2 and FIGURE 4 which parts may be provided with inflatable pads. This arrangement enables the body of the pilot to be moved in relation to his controls to the position it would occupy in flight. Provided, therefore, that the flying harness is loose when not inflated and the expansion, when operated, considerable and fairly rapid the simulation is reasonably economic and effective. For example, downward pressure in a tight turn would be achieved by suitably collapsing the inflatable seat cushion 44 below the central position and inflating the yoke lining 48 or the pads in the shoulder straps 10 and 11 FIGURE 1.

To simulate an upward pressure as in inverted flying the pressure in the pads of the shoulder straps or in the lining 48 of the yoke 29 would be reduced and the seat cushion 44 would be rapidly inflated, throwing the pilot upwards against his shoulder straps, this movement may be several inches and the pressure if sustained between the inflated seat cushion 44 and deflated straps or yoke would result in the pilot being held high out of his seat in the position he would occupy in inverted flight or in response to a violent downward "bump."

Side thrust on the pilot may, if required, be produced by inflating the pads 46, 47 on the side straps 12, 13.

The same applies to the fore and aft movements occasioned by acceleration and deceleration where the pads 43 and 45 are alternately inflated and deflated.

In all the forms of this invention where movement is applied to the pilot by the inflation or deflation of the pads on the harness and chair any fluid may be employed, for example water. For example, where air is employed the air pressure supply would be arranged to be very rapid through large bore pipes 49, 50, 51, 52, connecting a high pressure cylinder 53 to the pads 48, 45, 44, 43 preferably through an intermediate pressure regulating device 54 having a control 55 and through a quickly opening and closing multi-way selector valve mechanism 56 having a control 57 which determines the degree of pressure required to simulate a particular flight condition and also determines which of the pads are to be inflated or deflated. Deflation of the pads if insufficiently rapid may be assisted by vacuum means connected to a multi-way release valve mechanism 58.

As indicated above the straps 12 and 13 may be fitted with inflatable pads 46, 47 which may be differentially controlled by other pipe lines (not shown) leading to the valves 56, 58 should side pressure effects be required. The controls 55, 57 may be actuated under the influence of the pilot's controls and instruments or as analysed by a computer or by pre-set time control mechanism or directly by the pilot or instructor. The pilot's movement may be arranged to be say 3 inches to 6 inches from his normal central position in relation to his controls.

The tensioned straps of FIGURE 3 may be combined with the inflatable chair seat 44 and chair back 45 of FIGURE 4.

Figure 5:
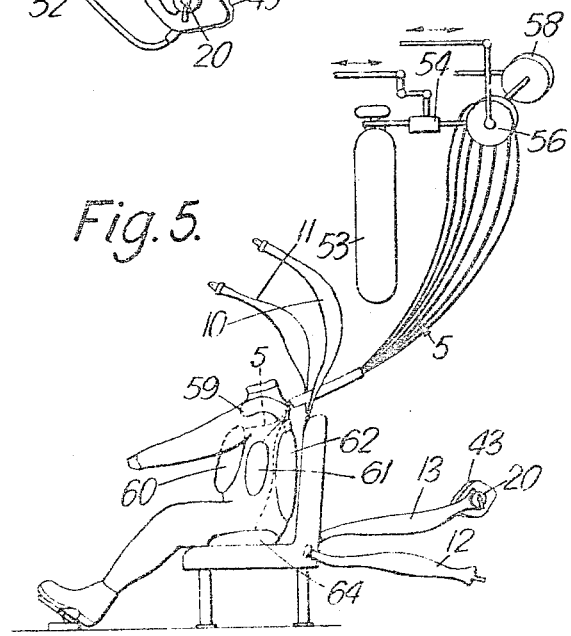
FIGURE 5 is a diagrammatic side view of an alternative form of pneumatic simulator embodying an auxiliary harness.

In the arrangement shown in FIGURE 5 the normal chair and flying harness are employed but the pilot is equipped with a specially constructed auxiliary harness or suit externally not dissimilar to the normal pressure suit or pressure jerkin employed for high altitude flying, in fact, for simulator training this special suit may be worn as a substitute for the normal pressure suit or pressure jerkin.

The specially constructed suit is, however, provided at different locations with inflatable portions indicated at 59, 60, 61, 62, and 64. The pads 59 are located in the region of the neck and the parts of the shoulders nearer the neck.

The pad 60 extends over the abdomen and lower parts of the chest.

The pads 61 extend over the pilot's sides beneath the arms.

The pad 62 extends across the back.

The pad 64 extends over the area of the seat.

Thus by differentially controlling the pressure in these portions through pipe lines 5 by valve mechanisms 56, 58 associated with sources of pressure and vacuum in a similar manner to that described with reference to FIGURE 4 the pilot is moved from his normal central position in relation to his controls within the limits of his chair and normal ying harness, and held against the said chair and harness at the required pressure for the required period.

There may be formed over the expandible portions of the said suit loose concertina sided pockets of rubberised fabric, or pockets formed from other expandible or elastic material so as to control the extent and direction of inflation.

The reaction to resist lateral side-thrust from the inflatable pads 61 may be obtained against the side arms of the normal Martin Baker chair but when this type of pilot's chair is not employed the arms of the chair or equivalent members installed for this purpose may fulfill this function.

In order to assist the deflation of the inflated pockets, vacuum means may be incorporated in or operated with the pressure selector-valve and associated pressure controls as shown and described in FIGURE 4.

The arrangement shown in FIGURE 5 may be employed in combination with any of the alternative methods comprised in this invention and is particularly applicable to operational combat aircraft simulators. Where a pressure suit or jerkin is normally worn by the pilot its substitution by an externally similar garment of the type described in FIGURE 5 will not detract from the simulation and procedure of normal flying training.

In FIGURE 6 is shown a form of this invention employing an auxiliary harness which most closely simulates the independent movement of the pilot's body as a whole within the restraining limits of his normal chair and flying harness as is occasioned by the changes of momentum occurring in flight and particularly the feeling of weightlessness such as is experienced in manned space flight but which, however, involves the use of an auxiliary harness as illustrated in addition to the normal flying harness when employed in aircraft (not shown) which is preferably worn within the auxiliary harness.

The pilot's body is mechanically or preferably pneumatically gripped around the abdomen within a substantially rigid belt 65 capable of universal movement, and other parts of his body and equipment may be similarly gripped and moved by means of extensions connected to the said rigid belt as shown in FIGURES 7, 8 and 9. The belt is provided with a pneumatic lining 66 FIGURE 7 and simulation of violent changes of momentum may be physically assisted by the sudden inflation from a source of pressure 67 controlled by a valve 68 and movement of the belt by mechanism indicated generally at 69 (FIGURE 6) and attachments. Small changes of momentum are simulated by a corresponding gentle inflation and movement.

Where no changes of momentum are indicated the deflation of the belt and extensions, which may be accelerated by a source of vacuum means 70 and control valve 71, enables the pilot to move freely without being unnecessarily conscious of restraint as the effective circumference of the belt is readily increased on deflation by more than twelve inches.

In this form of the invention, moreover, instead of being to some extent conscious of local pressures when his body is moved in relation to his chair and flying harness the movement of the belt 65 for example in a fore and aft direction when inflated tends initially to exert an equal air pressure around his abdomen and back without undue indication of the direction of the source of pressure and resulting movement until he is restrained by the fixed parts of his chair and harness.

The pilot can control the degree of pressure by means of an adjustable exhausting valve 126 which automatically exhausts when a preset pressure is reached.

The inflatable belt may communicate with an inflatable yoke shown in FIGURE 8 through a suitable conduit 127.

In the arrangement shown in FIGURE 6 a rigid operating arm 70 is moved in any required direction preferably parallel to its axis by mechanical means indicated generally at 69 which may be known hydraulic or servo motor or other means, which rigid operating arm is detachably and rigidly connected at 71 to the belt FIGURE 7. The belt comprises a number of rigid parts 72, 73, 74 formed from steel, aluminium alloy, or plastics of sufficient strength to prevent deflection under load from the arm 70, which parts are hinged together at 75, 76. The free ends of the parts 73, 74 may be secured together by straps 96 and buckles 97 whereby the belt may be adjusted circumferentially. The rigid or hooped portion may be only of the order of two to six inches wide or sufficient to avoid undue deflection of the belt when the arm 70 is moved.

As shown in FIGURE 6 a chair 14 is rigidly mounted in relation to the mechanical means 69 within the simulator cockpit (not shown) and is provided with an aperture 78 in the back 23 for entry of the said rigid operating arm 70 to enable the said belt 65 and with it the pilot to be moved in any required direction and at the required velocity and pressure within the limits of the said chair 14 and of the normal "Sutton" type or other fixed flying harness indicated at 10 and 12 and connected to the chair in a conventional manner such as is shown in FIGURE 5 the said belt being worn preferably over the harness.

A neck yoke 29 similar to that of FIGURE 2 may be rigidly connected to the belt by the straps 79, 80, 81 82 and buckle attachments 94 on the belt. A boatswain's chair 83 may be connected to the underside of the belt by straps 84, 85 and buckle attachments 94a. The belt may be interconnected with the pilot's equipment such as his flying helmet and oxygen mask so that when the belt is moved for example to stimulate a dive or a rapid climb the mask moves on the pilot's head. The small relative movement of the belt on the pilot's body facilitated when it is lined with resilient or inflatable pneumatic padding.

The mechanical means for imparting bodily movement to the belt as shown in FIGURE 6 comprises an arrangement of lead screws 88, 89, 90 providing for fore and aft, up and down and sideways movements respectively, which lead screws are fixed against rotation and are engaged by nuts 91, 92, 93 which are rotated by separate motors which may be automatically controlled by movement of the pilot's controls or as analysed by a computer or by pre-set time controlled mechanism or directly by the pilot or the instructor.

A suitable form of rigid expandible belt for the above arrangement comprises sheet steel of ⅛ inch thickness, having a back plate 72 five inches wide by four and a half inches high hinged at 75, 76 to two curved side plates 73, 74, four and a half inches high at the hinged end diminishing uniformly to three inches at the front opening.

The curved side plates 73, 74 have each an arc eighteen inches long and the front edges are adjustably joined by an upper and lower one inch wide webbing straps 96 and buckles 97 attached respectively to the said side plates which may be so arranged as to encompass or tolerate the central fastening of the type of Sutton harness recently adapted to secure both the pilot's parachute harness and his fixed harness. This harness may thus be worn inside the said rigid belt which is placed around the pilot after completion of his normal routine harness procedure and thus does not interrupt his training in this respect.

In order to obviate undue local pressure of the said comparatively wide belt upon the pilot's body the said belt may be resiliently padded or inflatably lined as indicated at 99 FIGURE 8.

The said padding or inflatable lining may extend above and below the upper and lower edges of the rigid belt and also beyond the open curved frontal edges to form a backing to his said frontal fastenings and to provide a resilient overlap for adjustment of the circumference of the belt.

The said padding or inflatable lining as so extended may be supported by a backing of plastics or other flexible material capable of conforming to the varying curvature of the hinged rigid belt and of supporting the pressure between the pilot's body and the said backing.

When inflatably lined the inflation pressure commonly necessary to grip the body of the pilot is of the order of ½ lb. per sq. inch and seldom exceeds 3 lbs. per sq. inch and thus the said backing need only be of moderate strength and section and thus may provide a convenient anchorage for the attachment of the said padding and of the said inflatable lining.

The said rigid belt 65, neck yoke 29, and boatswain's chair 83 and other attachments of the said belt may be yieldingly lined with foam rubber or the like and may be adjusted by the pilot sufficiently to grip and embrace his body by the adjustable straps and fastenings shown in FIGURES 7 and 8. Alternatively these parts may be provided with inflatable pads.

The said belt may be mechanically tensioned or extended to grip and release the pilot's body to the required degree, for example, by two sheathed cables as shown in FIGURE 9 in which the end of one cable 125 is secured to the front end of the part 73 of the belt and extends across the gap between the parts 73, 74 when it enters its sheath 126a hich extends around the parts 74 and and 72. The other cable 127a is secured to the front end of the part 74 of the belt and extends across between the belt parts 74, 73 when it enters its sheath 128 which extends around the belt parts 73, 72. The cables 125 and 127a leave their sheaves at the back of the belt part 72 and are joined to a single cable 129 which passes into a sheath 130 and thence to the mechanism 69 which imparts movement to the arm 70 and is operated by a separate motor.

The unhinged frontal edges of the curved side plates 73 and 74 when drawn together or released may be arranged to slide over a frontal overlap of the flexible backing for the belt as described and may thus be free to move out of contact with the pilot's clothing or harness.

The said hinges 75, 76 of the said belt may be provided with opening springs 100 so that the circumference of the belt tends to increase.

Thus in simulated steady flight where no change of momentum is occasioned the said belt may be mechanically extended or enlarged so that the grip on the pilot is relaxed and he is free to move in relation to his chair. Where, however, a change of momentum is arranged to occur in response to movement of the engine or flight controls by the pilot or by pre-set time mechanism or by the instructor the said belt is mechanically tensioned to grip the pilot's body so that he may be firmly moved in response to the movements of the said operating arm 70 and rigid belt in response to indicated changes of momentum.

Similar means may be employed to tension or release the said yoke 29, boatswain's chair straps 84, 85.

It will be appreciated that the inflatable linings instead of being attached to the rigid belt, collar and boatswain's chair as in FIGURE 8 may take the form of a separate inflatable harness or garment attached to the pilot somewhat similarly to that shown in FIGURE 5. In this case before entering the said rigid belt 65 and associated collar 29 the pilot may have attached to him a wholly or partly inflatable harness which may take the form of a waistcoat or suit of rubberised fabric which may be inflated after he has entered the said rigid belt and associated parts so that his body may be gripped within it at the required pressure. A conventional harness such as is shown in FIGURE 5 is preferably worn under said inflatable garment in order that when the pilot is moved by the said belt the normal harness may press directly against the pilot's body in the usual way. The said conventional harness may be worn outside said inflatable garment in order to follow the normal practice although the pressure of the conventional harness on the pilot's body is somewhat reduced. Alternatively the pilot's pressure suit or pressure jerkin, if normally worn for simulator training, may readily be converted and employed for this purpose by connecting it, or separate compartments formed in it, by piping through selector valve mechanism to a source of pressure and vacuum as previously described.

In order to facilitate the attachment of the said inflatable linings to said rigid belt and associated harness and to provide for their extension over a wider area than that provided by the rigid belt as shown in FIGURE 8 the said rigid belt 65, collar 29 and boatswain's chair 83 may be first lined with an inner backing of plastics sheet, leather or the like which inner backing may extend beyond the edges of the said parts to provide a greater area for the application of pneumatic pressure and to form a convenient attachment to the said inflatable inner membrane or lining and to permit some small movement of the attached edges of the said inflatable membrane when inflated or evacuated.

The said inner membrane is preferably composed or rubberised fabric but may be of plastics, or of any elastic inflatable material for example rubber and may be provided with a pneumatic pressure control or safety valve 126 situated for example on the upper front edge of the said inflatable lining 99 as shown in FIGURE 8 or to any convenient part of it if worn as a garment. The belt may be connected through a conduit 101 and valves 68 or 71 to a source 67 of supply of high pressure air for example a compressed air cylinder or with a source of vacuum 77. The said source of high pressure air may also communicate with the inflatable membranes of the said yoke 29, or of the boatswain's chair which may for example communicate by flexible tubing with the inner membrane of the said rigid belt.

The pneumatic pressure applied to the pilot's body through the aforementioned harness in the manner described may be adjusted by the pilot by means of the pressure controlling safety valve 126 to suit his own comfort and sufficiently to provide an even pressure to insulate him from the rigid parts and semi-rigid parts of the said harness when inflated. Where required for the comfort of the pilot it may be arranged for the pneumatic pressure to be released during periods of simulated steady flight involving no substantial changes of momentum the said pressure being automatically and rapidly restored to the required level should changes of momentum occur which would result in substantial movement of the said rigid belt and attached harness. This may be achieved by connecting the said high pressure air supply through a known type of pressure reducing valve set to the required pressure limit the said high pressure air being injected or released by means responsive to changes in velocity as described in FIGURE 4. This will enable the pilot to have free movement within the said belt and harness to operate his controls in the normal way unless otherwise required to be controlled by changes of momentum.

The automatic change in pressure may be obtained by movement of certain of the pilot's controls for example his throttle and elevator controls by adjustment of his instruments or again by a pre-set time control mechanism or by the instructor.

In the arrangement shown in FIGURES 6 to 8 where in order to simulate a change of momentum in which the pilot must be forcibly lifted upwards from his seat and subjected to great upward pressure against the shoulder straps of his normal flying harness and the simulation for this purpose provided by the said boatswain's chair or thigh straps and the circumferential grip of the said rigid belt may not provide sufficient bodily upward lift of the pilot, the upper edge of the said rigid belt may as shown in FIGURE 9 be provided with two rigid vertical crutch-like attachments 102 to extend upwards below each armpit the rigid curved upper portion of the said crutch being provided with upper resilient or inflatable padding 103 to conform to the contours of the pilot's lower arm and armpit.

Each crutch 102 may be adjustable in an up and down direction for which purpose the shank portion 104 may be slotted at 104a and passed over a stud on the belt which is provided with a clamping nut 105.

The support for the pilot's thighs in the neighbourhood of the spine may be provided as already described by a transverse plate 83 similar to the seat of a boatswain's chair being arranged to pass under the pilot and be adjustably attached at both ends to the lower edges of the belt.

It has been found by experiment that a sensation of almost complete levitation or weightlessness may be imparted to a seated individual if he is lifted by an even pressure applied upwards below the armpits and beneath the thighs in the region of the lower spine and this effect is obtained by applying upward movement of the rigid belt associated with movement of the said boatswain's chair either alone or in combination with the said underarm supports.

Similarly it has been found that a downward pressure of the body on to the pilot's seat of an aircraft during a loop or tight turn is most closely simulated by applying a downward pressure at the back and sides of the neck and inner shoulders in the region of the spine accompanied by a circumferential downward pressure in the region of the abdomen and this effect is obtained by applying downward movement to the belt which is linked to the collar 29.

It is considered desirable in operating conventional flight simulators to endeavour to introduce a feeling of tension or even apprehension in the mind of a pilot when engaged in simulated combat or other critical manoeuvres, and this feeling may be assisted when a violent change of momentum is indicated by suddenly inflating the said harness FIGURES 6 to 8 to grip the pilot and then by applying the required vigorous movement and force upon his body in relation to his chair and flying harness. This feature associated with the method described in FIGURES 6 to 8 may be found particularly advantageous in simulating the "catapult" take-off and "arrestor hook" landing employed in aircraft carriers where sudden forces of the order of 4G are encountered.

In the arrangement shown in FIGURE 10 instead of the pilot being moved relatively to the chair 14 and harness as in the previous constructions, bodily movement is imparted to the chair itself.

The chair may be provided with a substantially rectangular frame and at or near each corner of the frame there is mounted a jack cylinder 107 within which is mounted a piston or ram 108. The lower end of the piston rod of each ram has fixed to it a castor wheel 109 which runs on a flat surface. Also attached to the chair frame are four cables 110, 111, 112, and 113 which are actuated by four independent motors (not shown) so that the resulting force from the pull of the cables may move the chair frame in any direction in the horizontal plane, whereas the differential operation of the jacks 107 may tilt the chair in various directions or may move it bodily in an up and down direction.

The pilot may be held in the chair by conventional harness straps 10, 11, 12, 13 which may be affixed thereto but instead of these straps being connected to the chair they may be anchored to the floor by cables 115, 116, 117, 118 and the releasable clamp 20 is connected to the floor by a cable 119.

Alternatively the chair may be rigidly fixed against horizontal movement and thus the cables 110, 111, 112, and 113 are eliminated but the jacks are retained so as to impart tilt at various angles and/or up and down movement. Thus the effects of changes of momentum and particularly of "bumps" or the "buffeting" of an aircraft may be economically simulated, and the apparatus may conveniently be applied to commercial passenger-aircraft simulators. As indicated above the normal flying harness may be attached to the chair but if sustained restraining pressure is required to be simulated the ends of the harness normally attached to the chair may be attached to the floor of the simulator as shown in FIGURE 10.

The selective control of the power means for obtaining the movement and pressure applied to the pilot according to this invention may be by linkage by known means to the pilot's controls and instruments by potentiometer means and or as analysed by a computer or by time control or by manual means operated by the instructor or pupil.

A simple known means of simulating, for example, the readings of the pilot's instruments is by electrical or other linkage with the pilot's engine and flying controls and this means is also employed for adjusting the attitude of the simulator as a whole, for applying total movements of a few feet to the simulator, and for regulating the resistance of the pilot's flying controls in relation to the supposed or indicated speed of the simulator.

These or similar automatic means may be employed for selecting and regulating the movement to be applied in the manner described to the pilot's body by the various means provided by this invention, and this existing mechanism provides a convenient way of adapting this invention for use in existing flight simulators.

Where however no such mechanism already exists for automatically controlling the power means employed in this invention, a simple automatic selection control of the power means may be provided by electrical linkage with the pilot's operating controls employing known potentiometer, computer and servo motor technique.

For example the pilot is pressed back in his seat as the result of acceleration in proportion to a pre-calculated function of the rate and extent of the throttle opening, the pressure being relieved after a pre-calculated period. A reverse pressure is applied when the throttle is closed, the flaps operated and the landing brakes applied according to the extent and rate of application of these controls and the resultant pre-calculated deceleration. Similarly according to the rate and extent of the throttle opening and the estimated change of angular velocity of the aircraft as indicated by the movement of the elevator controls the pilot is pressed downward into his seat or lifted from it. Sideways thrust is similarly applied to the pilot where the rudder controls are operated in flight in relation to a given throttle position without use of aileron or elevator controls.

Hitherto in flight simulators effective means have been provided for simulating the visual and aural environment of a pilot and for providing him with practice in cockpit and navigational procedure and with small short-period movement and vibration.

Such means may be retained in the present arrangement and according to this invention, relatively simple means are further provided for simulating the physical reaction, movement and sustained pressure within his chair and harness suffered by a pilot in actual flight which movement and pressure, particularly during combat manoeuvres, involve pressures of many times his own weight over a prolonged period of time.

It will be appreciated that any of the forms of the invention as described in FIGURES 1 to 10 and otherwise comprising this invention may be used to supplement or provide additional movements and pressures to those provided by conventional flight simulators where the cockpit itself is moved to an insufficient extent to provide movement and sustained pressures.

I claim:

1. An apparatus to simulate changes in movement of a vehicle comprising a chair to be occupied by an occupant; harness means on said chair for engaging portions of the body of the occupant of said chair to hold said occupant yieldingly in position; a plurality of different selectively operable means for applying controllable, variable, independent pressures to selected portions of said occupant's body including external mechanical means for applying movement to parts of the chair and harness and said operable means and said harness means permitting a controled and restrained, yielding movement of the occupant's body limited by said harness in the selected direction of the applied pressure relative to the chair whereby inertia forces as would result from changes in movement of said chair are simulated.

2. An apparatus according to claim 1 wherein said harness means includes a yoke containing guideways extending around the nape of the occupant's neck and over those parts of his shoulders adjacent the neck and wherein said selectively operable means is connected to said harness means, said harness means including straps which fit over the shoulders and pass through said guideways in said yoke whereby tension in the straps exerts a downward pressure on said yoke and upon the occupant's spine and which guideways prevent the straps from slipping off the yoke onto the occupant's shoulders.

3. An apparatus according to claim 1 wherein said harness means comprises a conventional harness and a supplementary harness the former of which comprises shoulder straps connected at one end to the chair and passing over the shoulders and connected at the other end to the center of a flexible belt which is also connected to the chair and the supplementary harness comprises a comparatively rigid belt connected to power means which is adapted to move it in an up and down, fore and aft, or in sideways directions or in any combination of these movements according to the inertial effect to be simulated.

4. An apparatus according to claim 3 wherein said comparatively rigid belt has rigidly fixed thereto a shaft which extends through an opening in the back of said chair and is operated by said power means through a transmission arranged to impart to it said combination of movements.

5. An apparatus according to claim 3 wherein a yoke including guideways is arranged to extend over the shoulders and around the neck of said occupant and over or under the conventional harness and is attached by straps to the back and front of the comparatively rigid belt and wherein the shoulder straps of the conventional harness are arranged to extend through said guideways in said yoke.

6. An apparatus according to claim 5 wherein said yoke and belt include inflatable padding.

7. An apparatus according to claim 3 wherein a boatswain's type chair is adjustably attached to opposite sides of the belt.

8. An apparatus according to claim 3 wherein crutches are adjustably mounted on said comparatively rigid belt, so as to be movable in an up and down direction and to be engageable beneath the armpits of the occupant.

9. An apparatus according to claim 3 wherein means are provided for contracting and expanding said comparatively rigid belt.

10. An apparatus for simulating changes in movement of a vehicle comprising a chair frame having a back and a seat and arranged to rest upon a support, a harness having parts which extend over the shoulders of the occupant of the chair and downwardly towards the seat and a part engageable with at least the abdomen of the occupant extending towards the back of the chair, which chair and parts are arranged to locate the body of the occupant in a normal position but permit yield in an up and down and fore and aft direction, and controllable power means adapted to impart controllable pressure and movement to the occupant's body in said directions through at least one of said parts including external mechanical means for applying movement to parts of the chair and harness and said power means and harness permitting a controlled and restrained, yielding movement of the occupant's body limited by said harness in the selected direction of the applied pressure relative to the chair.

11. An apparatus according to claim 10 wherein said seat and parts of the harness which extend across the shoulders of the occupant and downwardly towards said seat are movable in an up and down direction relatively to the chair frame and the back of the chair and said part of harness which engages at least the abdomen of the occupant are movable relatively to the chair frame in a fore and aft direction and said power means is provided with differentially movable actuating means connected to said seat, back and said parts of the harness.

12. An apparatus according to claim 10 wherein said parts of the harness which extend across the shoulders of the occupant and downwardly towards said seat are fixed against up and down movement and said part of the harness which engages at least the abdomen of the occupant is fixed against fore and aft movement and said power means comprises differentially movable actuating means adapted to impart fore and aft movement and up and down movement to said chair.

13. An apparatus according to claim 10 wherein means are provided for imparting movement to auxiliary equipment relative to said occupant.

14. An apparatus according to claim 10 wherein said power means provided with controls linked to computer mechanism by potentiometers and servo motors and is conditioned by vehicle controls actuated by said occupant.

15. An apparatus according to claim 14 wherein said power means is controlled by the potentiometers and servos direct from pilot controls and instruments.

16. An apparatus according to claim 12 wherein those parts of the harness which extend over the shoulders and downwardly towards the seat are connected to the part which engages the abdomen and which part is connected to the support and wherein those parts of the harness which extend downwardly from the shoulders at the back of the occupant are fixed to said support.

17. An apparatus according to claim 11 wherein each of said movable seat and back portions of said chair are formed in a number of parts and said power means is provided with actuating means for differentially moving the said parts so that the occupant may be moved bodily sideways or tilted sideways.

18. An apparatus according to claim 11 wherein a said power means is provided with controls for selectively imparting relative variable movements between the parts of the equipment and parts of the chair, which control means are arranged to be actuated by the occupant in operating his controls.

19. An apparatus according to claim 11 wherein parts of the harness which extend downwardly towards the seat are connected to that part of the harness which engages the abdomen of the occupant, and wherein two other parts of the harness which extend downwardly from the shoulders are connected to independently operated members of said power means.

20. An apparatus according to claim 11 and wherein the part of the harness which engages shoulders of the occupant has extensions on opposite sides of the occupant which are connected to independently operated members of the power means whereby sideways movement may be imparted to the occupant.

21. Apparatus according to claim 11 for simiulating the changes in movement and attitude of a vehicle comprising a chair frame of the kind normally used for the vehicle, the seat and back of which or parts thereof are adapted to be movable and are connected to members of the power means, and a harness having parts which extend over the shoulders of the occupant and other parts which embrace at least the abdomen of the occupant, and other parts extending on opposite sides of the occupant each of which parts are attached to cables or the like connected to members of the power means so that variable up and down, fore and aft and sideways pressure and movement may be applied to the occupant from the said power means.

References Cited by the Examiner

UNITED STATES PATENTS

| | | | |
|---|---|---|---|
| 1,342,871 | 6/1920 | Ruggles | 35—12 |
| 1,537,464 | 5/1925 | Hummel | 128—25 |
| 2,195,334 | 3/1940 | Lethern | 244—122 |
| 2,208,990 | 7/1940 | Lewis | 244—122 |
| 2,394,523 | 2/1946 | Pancoe. | |
| 2,475,003 | 7/1949 | Black | 128—25 X |
| 2,572,149 | 10/1951 | Hind | 272—58 |
| 2,638,293 | 5/1953 | Lindstrom | 244—122 |
| 2,667,917 | 2/1954 | Dustin | 128—134 X |
| 2,674,231 | 4/1954 | Erickson | 128—24 |
| 2,790,439 | 4/1957 | Mayers | 128—25 |
| 3,008,464 | 11/1961 | Atkins | 128—25 |
| 3,074,669 | 1/1963 | Bohlin | 244—122 |
| 3,097,436 | 7/1963 | Gaucher | 35—12 |
| 3,099,261 | 7/1963 | Doss et al. | 244—122 X |

EUGENE R. CAPOZIO, *Primary Examiner.*

JEROME SCHNALL, L. SMILOW, *Examiners.*

S. M. BENDER, *Assistant Examiner.*